US012199349B2

(12) United States Patent
Guo et al.

(10) Patent No.: US 12,199,349 B2
(45) Date of Patent: Jan. 14, 2025

(54) CAVITY PHASE SHIFTER AND BASE STATION ANTENNA

(71) Applicant: Outdoor Wireless Networks LLC, Claremont, NC (US)

(72) Inventors: Pengfei Guo, Suzhou (CN); Yan Wang, Suzhou (CN); Hangsheng Wen, Hickory, NC (US)

(73) Assignee: Outdoor Wireless Networks LLC, Claremont, NC (US)

( * ) Notice: Subject to any disclaimer, the term of this patent is extended or adjusted under 35 U.S.C. 154(b) by 155 days.

(21) Appl. No.: 17/774,908

(22) PCT Filed: Oct. 29, 2020

(86) PCT No.: PCT/US2020/057863
§ 371 (c)(1),
(2) Date: May 6, 2022

(87) PCT Pub. No.: WO2021/096687
PCT Pub. Date: May 20, 2021

(65) Prior Publication Data

US 2022/0393347 A1 Dec. 8, 2022

(30) Foreign Application Priority Data

Nov. 12, 2019 (CN) ......................... 201911099738.7

(51) Int. Cl.
*H01Q 3/36* (2006.01)
*H01P 1/18* (2006.01)
(Continued)

(52) U.S. Cl.
CPC ............... *H01Q 3/36* (2013.01); *H01P 1/184* (2013.01); *H01Q 1/246* (2013.01); *H01Q 1/36* (2013.01); *H01Q 1/50* (2013.01); *H01Q 19/10* (2013.01)

(58) Field of Classification Search
CPC ........... H01P 1/18; H01P 1/184; H01Q 1/246; H01Q 1/36; H01Q 1/38; H01Q 1/50;
(Continued)

(56) References Cited

U.S. PATENT DOCUMENTS 9,444,151 B2 9/2016 Kurk et al.
10,062,939 B2 * 8/2018 Liu ......................... H01P 5/182
(Continued)

FOREIGN PATENT DOCUMENTS

CN 203950929 U 11/2014
CN 109841963 A 6/2019
(Continued)

OTHER PUBLICATIONS

"International Preliminary Report on Patentability corresponding to International Application No. PCT/US2020/057863 mailed May 27, 2022".

(Continued)

*Primary Examiner* — Raymond R Chai
(74) *Attorney, Agent, or Firm* — Myers Bigel, P.A.

(57) ABSTRACT

The present invention relates to a cavity phase shifter with a housing having at least one cavity and a transmission line mounted in the cavity. The transmission line is provided with an input end and an output end. The output end of the transmission line is electrically connected to another transmission line outside the cavity without the aid of a cable. The cavity phase shifter also includes a movable element mounted within the cavity. Movement of the movable element is configured to adjust a phase shift experienced by an RF signal that travels between the input end and output end of the transmission line. The cavity phase shifter can be provided in a base station antenna having a reflector; a feed board mounted forwardly of the reflector; and a radiating element extending forwardly from the feed board. The phase (Continued)

shifter is mounted rearward of the reflector. The phase shifter includes a printed circuit board that extends perpendicularly to the feed board, and an output end of a transmission line on the printed circuit board is soldered to a trace on the feed board. Thus, the insertion loss associated with the phase cables would be reduced and the gain performance of the antenna can be improved.

16 Claims, 7 Drawing Sheets

(51) Int. Cl.
*H01Q 1/24* (2006.01)
*H01Q 1/36* (2006.01)
*H01Q 1/50* (2006.01)
*H01Q 19/10* (2006.01)

(58) Field of Classification Search
CPC ............ H01Q 3/32; H01Q 3/36; H01Q 19/10; H01Q 21/26
See application file for complete search history.

(56) References Cited

U.S. PATENT DOCUMENTS 10,158,165 B2 * 12/2018 Sledkov ................. H01Q 1/246
10,446,896 B2 * 10/2019 Sledkov .................. H01P 1/184
11,196,183 B2 12/2021 Xiao et al.
11,864,591 B2 * 1/2024 Reevell ................ H05B 3/0019
2015/0042530 A1 2/2015 Kitano et al.
2015/0200467 A1 * 7/2015 Kurk ...................... H01Q 1/241 343/853
2017/0012336 A1 * 1/2017 Liu ......................... H01P 1/207
2017/0288306 A1 * 10/2017 Sledkov .................. H01P 1/184
2017/0358865 A1 * 12/2017 Sledkov ................... H01Q 3/32
2018/0108990 A1 * 4/2018 Xiao ......................... H01P 1/18
2019/0116502 A1 4/2019 Guo et al.
2020/0303838 A1 * 9/2020 Xiao ........................ H01Q 3/32
2022/0123467 A1 * 4/2022 Li ............................ H01Q 1/48
2023/0253710 A1 * 8/2023 Ren ......................... H01P 1/182 343/702

FOREIGN PATENT DOCUMENTS

CN 109904597 A 6/2019
CN 210430036 U 4/2020
WO WO-2008017725 A1 * 2/2008 ............. H01P 1/185

OTHER PUBLICATIONS

"International Search Report and Written Opinion corresponding to International Application No. PCT/US2020/057863 mailed Mar. 15, 2021".
First Chinese Office Action, including English translation, corresponding to CN 201911099738.7, May 18, 2024, (20 pages).

* cited by examiner

CAVITY PHASE SHIFTER AND BASE STATION ANTENNA

RELATED APPLICATIONS

This patent application is a 35 U.S.C. § 371 national stage application of PCT Application No. PCT/US2020/057863, filed Oct. 29, 2020, which claims priority to and the benefit of Chinese Patent Application Serial Number 201911099738.7 filed Nov. 12, 2019, the content of each of which is hereby incorporated by reference as if recited in full herein.

TECHNICAL FIELD

The present invention generally relates to radio communications and, more particularly, to cavity phase shifters and base station antennas for cellular communications systems.

BACKGROUND

Remote Electronic Tilt ("RET") antennas are now widely used as based station antennas in cellular communications systems. Prior to the introduction of RET antennas, when the coverage area for a conventional base station antenna needed to be adjusted, it was necessary for a technician to climb the antenna tower on which the antenna was mounted and manually adjust the pointing angle of the antenna. Typically, the coverage area of the antenna is adjusted by changing the so-called "tilt" angle of the antenna, which is the angle in the elevation plane of the boresight pointing direction of the antenna beam generated by an array of radiating elements included in the antenna. The introduction of RET antennas allowed a cellular operator to electrically adjust the tilt angle of the antenna beam by sending a control signal to the antenna. RET antennas use phase shifters to apply different phase shifts to the sub-components of an RF signal that are transmitted through respective sub-arrays of the radiating elements in the array of radiating elements that generates the antenna beam. By applying different phase shifts to different sub-components of the RF signal, the tilt angle of the antenna beam(s) formed by the array of radiating elements may be adjusted.

A number of different types of phase shifters are known in the art, including rotary wiper arm phase shifters, trombone style phase shifters and sliding dielectric phase shifters. In a rotary wiper arm phase shifter, a wiper printed circuit board is mounted above a main printed circuit board by a pivot pin so that the wiper printed circuit board may rotate above the main printed circuit board. Typically the phase shifter will include one or more power dividers that split an RF signal that is input to the phase shifter into a plurality of sub-components. At least a portion of the RF signal is transferred to the wiper printed circuit board and then coupled from the wiper printed circuit board to transmission paths on the main printed circuit board. The path length through the phase shifter of each sub-component of the RF signal that is transferred to the wiper printed circuit board depends upon the position of the wiper printed circuit board above the main printed circuit board. Thus, by moving the wiper printed circuit board (e.g., using an actuator) the phases of the sub-components of the RF signal may be adjusted in order to change the tilt angle of the antenna beam. Trombone style phase shifters operate in a similar manner, except that the moveable element of the phase shifter moves linearly instead of along an arc. Sliding dielectric phase shifters have a fixed transmission path length and a movable dielectric material, wherein the coverage area or length of the dielectric material on the transmission path may be adjusted, so as to realize different phase shifts along different transmission paths. Each of the above-described types of phase shifters may be implemented as "cavity" phase shifters where the phase shifter is enclosed in a metal housing that is coupled to electrical ground. The metal housing may reduce RF signal losses, and hence lower the insertion loss associated with the phase shifter.

In order to improve communication quality, multiple input multiple output (MIMO) base station antennas and beamforming base station antennas are currently being deployed, in which multiple arrays of radiating elements are employed for transmission and/or reception. Achieving high antenna gain may be important with these types of antennas in many applications. However, the so-called "phase cable" connections between the phase shifters and the feed boards on which the radiating elements have an associated insertion loss, which reduces the gain of the antenna.

SUMMARY

According to a first aspect of the present invention, a cavity phase shifter is provided. The cavity phase shifter includes a housing having at least one cavity; a transmission line mounted in the cavity. The transmission line is provided with an input end and an output end. The output end of the transmission line is electrically connected to another transmission line outside the cavity without the aid of a cable. The cavity phase shifter also includes a movable element mounted within the cavity. Movement of the movable element is configured to adjust a phase shift experienced by an RF signal that travels between the input end and output end of the transmission line.

Pursuant to embodiments of the present invention, at least the connection between the cavity phase shifter and the feed board can be devoid of and/or is free from cables, thereby reducing the insertion loss associated with the phase cables and improving the gain performance of the antenna.

In some embodiments, the cavity phase shifter can include a first printed circuit board, and the transmission line can be configured as a printed trace on the first printed circuit board.

In some embodiments, the housing can be provided with a first slot, through which the input end of the transmission line can extend to the exterior of the cavity.

In some embodiments, the input end can be configured to be electrically connected to an inner conductor of a cable.

In some embodiments, the input end can be configured to be soldered to the inner conductor of the cable.

In some embodiments, the housing can have a first protruding extension, which can be configured to be electrically connected to an outer conductor of a cable.

In some embodiments, the first protruding extension can be configured to be soldered to the outer conductor of the cable.

In some embodiments, the first protruding extension can be disposed adjacent the input end of the transmission line.

In some embodiments, the housing can be provided with a second slot through which the output end of the transmission line can extend to the exterior of the cavity.

In some embodiments, the output end of the transmission line can extend through the second slot, a reflector and a feed board.

In some embodiments, the output end can be configured to be electrically connected to a transmission line on a feed board.

In some embodiments, the output end can be configured to be soldered to the transmission line on the feed board.

In some embodiments, the output end can be configured to be electrically connected to a transmission line on a feed stalk of a radiating element.

In some embodiments, the output end can be configured to be soldered to the transmission line on the feed stalk of the radiating element.

In some embodiments, the housing can have a second protruding extension that can be configured to be soldered to a pad on a feed board for radiating elements, the pad can be electrically connected to a ground metal layer on the feed board.

In some embodiments, the transmission line can have a plurality of output ends. Each output end can have a corresponding second protruding extension.

In some embodiments, each output end can be parallel to the corresponding second protruding extension outside the cavity.

In some embodiments, the at least one cavity can include a first cavity in which a first transmission line can be mounted and a second cavity in which a second transmission line can be mounted.

In some embodiments, the output end of the first transmission line can feed a first polarization of a radiating element without the aid of a cable, and the output end of the second transmission line can feed a second polarization of the radiating element without the aid of a cable.

In some embodiments, least one output end of the first transmission line and at least one output end of the second transmission line can have a single corresponding second protruding extension. The second protruding extension can protrude from a partition wall between the first cavity and the second cavity.

In some embodiments, each of the output ends of the first transmission line and each of the output ends of the second transmission line can have a separate corresponding second protruding extension.

In some embodiments, the housing can be provided with an opening and an engagement wall that can extend at least part of the way about the opening. The engagement wall can extend outward in a direction that can be perpendicular to the opening.

In some embodiments, the engagement wall can be configured to be soldered with an outer conductor of a cable. An inner conductor of the cable can be capable of passing through the opening and extending into the cavity and being soldered to the input end of the transmission line.

According to a second aspect of the present invention, a cavity phase shifter is provided. The cavity phase shifter includes a housing having a first cavity and a first transmission line mounted in the first cavity. The first transmission line is provided with an input end and an output end. The output end can be configured to be soldered to a transmission line on a feed board for radiating elements. The cavity phase shifter can also include a movable element mounted within the first cavity. The movable element is configured to adjust a phase shift experienced by an RF signal that travels between the input end and output end of the first transmission line.

In some embodiments, the housing can be provided with a first slot, through which the input end of the first transmission line can protrude or through which an inner conductor of a cable can be capable of extending into the first cavity. The input end can be configured to be soldered to the inner conductor of the cable.

In some embodiments, the housing can have a first protruding extension which can be configured to be electrically connected to an outer conductor of the cable.

In some embodiments, the housing can be provided with a second slot through which the output end of the first transmission line can protrude. The output end can be configured to be soldered to a transmission line on a feed board for radiating elements.

In some embodiments, the output end of the first transmission line can extend through a reflector and the feed board for radiating elements from the interior of the first cavity.

In some embodiments, the housing can have a second protruding extension that can be configured to be soldered to a pad on the feed board for radiating elements, the pad can be electrically connected to a ground metal layer on the feed board.

In some embodiments, the housing can further include a second cavity, the second cavity and the first cavity can be separated from each other via a partition wall. A second transmission line can be mounted in the second cavity. The second transmission line can be provided with an input end and an output end, and the output end of the second transmission line can be configured to be soldered to a transmission line on a feed board for radiating elements.

In some embodiments, the output end of the first transmission line can feed a first polarization of at least one radiating element without the aid of a cable. The output end of the second transmission line can feed a second polarization of the radiating element without the aid of a cable.

According to a third aspect of the present invention, a base station antenna is provided. The base station antenna includes a phase shifter having a metal housing that defines a cavity, a reflector, and a feed board. The base station antenna also includes a radiating element mounted on the feed board. The phase shifter includes a transmission line provided with an input end and an output end. The output end of the transmission line extends outside the housing and is electrically connected to another transmission line outside the phase shifter without the aid of a cable.

In some embodiments, the phase shifter can include a printed circuit board that can extend perpendicular to the feed board. The transmission line can be configured as a printed trace on the printed circuit board.

In some embodiments, the phase shifter can be configured as a cavity phase shifter.

According to a forth aspect of the present invention, a base station antenna is provided. The base station antenna includes: a reflector; a feed board mounted forwardly of the reflector; a radiating element extending forward from the feed board; and a phase shifter. The phase shifter can be mounted rearward of the reflector. The phase shifter includes a printed circuit board that extends perpendicularly to the feed board. An output end of a transmission line on the printed circuit board is soldered to a trace on the feed board.

In some embodiments, the phase shifter can include a housing that can define a cavity. The output end of the transmission line can extend through a slot in the housing.

In some embodiments, the output end of the transmission line can further extend through a slot in the reflector.

BRIEF DESCRIPTION OF THE DRAWINGS

FIG. 2b is a partial schematic perspective view of the transmission lines of the cavity phase shifter of FIG. 2a.

DETAILED DESCRIPTION

Figure 1:
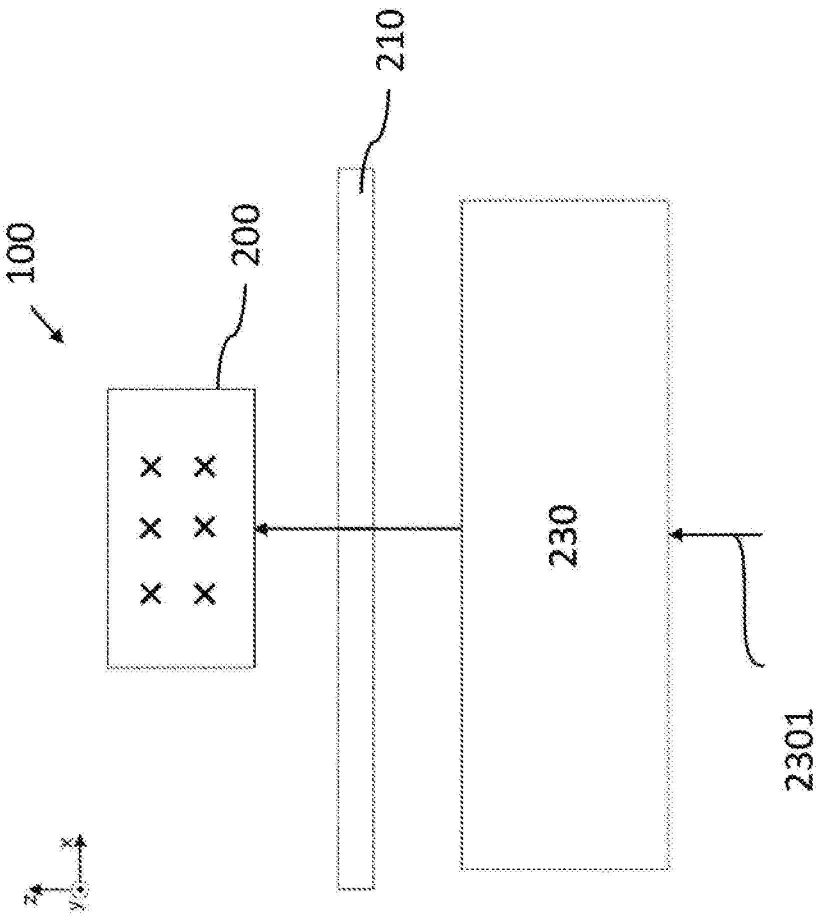
FIG. 1 is a schematic block diagram of an antenna in accordance with some embodiments of the present invention.

The present invention will be described below with reference to the drawings, in which several embodiments of the present invention are shown. It should be understood, however, that the present invention may be implemented in many different ways, and is not limited to the example embodiments described below. In fact, the embodiments described hereinafter are intended to make a more complete disclosure of the present invention and to adequately explain the scope of the present invention to a person skilled in the art. It should also be understood that, the embodiments disclosed herein may be combined in various ways to provide many additional embodiments.

In the drawings, the same reference signs present the same elements. In the drawings, for the sake of clarity, the sizes of certain features may be modified.

It should be understood that, the wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

The singular forms “a/an” and “the” as used in the specification, unless clearly indicated, all contain the plural forms. The words “comprising”, “containing” and “including” used in the specification indicate the presence of the claimed features, but do not preclude the presence of one or more additional features. The wording “and/or” as used in the specification includes any and all combinations of one or more of the items listed. The phases “between X and Y” and “between about X and Y” as used in the specification should be construed as including X and Y. As used herein, phrases such as “between about X and Y” mean “between about X and about Y”. As used herein, phrases such as “from about X to Y” mean “from about X to about Y.”

In the specification, when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being “directly on”, “directly attached” to, “directly connected” to, “directly coupled” with or “directly contacting” another element, there are no intervening elements present. In the specification, references to a feature that is disposed “adjacent” another feature may have portions that overlap, overlie or underlie the adjacent feature.

In the specification, words describing spatial relationships such as “up”, “down”, “left”, “right”, “forth”, “back”, “high”, “low” and the like may describe a relation of one feature to another feature in the drawings. It should be understood that these terms also encompass different orientations of the apparatus in use or operation, in addition to encompassing the orientations shown in the drawings. For example, when the apparatus shown in the drawings is turned over, the features previously described as being “below” other features may be described to be “above” other features at this time. The apparatus may also be otherwise oriented (rotated 90 degrees or at other orientations) and the relative spatial relationships will be correspondingly altered.

The cavity phase shifters according to embodiments of the present invention are applicable to various types of base station antennas, such as beamforming antennas or MIMO antennas. These antennas include phase shifters that are provided to adjust the relative phase shifts applied to sub-components of RF signals that are fed to the radiating elements of the arrays included in these antennas Typically, output ends of the phase shifter are connected via so-called phase cables to feed boards, where each feed board has one or more radiating elements mounted thereon. Transmission lines on the feed boards electrically connect the output ends of the phase shifter to the radiating elements. However, each phase cable has an associated signal insertion loss, and these insertion losses act to reduce the gain of the antenna Pursuant to embodiments of the present invention, at least the connection between the cavity phase shifter and the feed board is free from cables, thereby reducing the insertion loss associated with the phase cables and improving the gain performance of the antenna.

Embodiments of the present invention will now be described in more detail with reference to the accompanying drawings.

Refer to FIG. 1, which is a schematic block diagram of an antenna in accordance with some embodiments of the present invention.

FIG. 1 shows an antenna 100 including a reflector 210, antenna arrays 200 mounted on one side of the reflector 210 in columns, and a feed network 230 on the other side of the reflector 210.

The reflector 210 may be used as a ground plane for the antenna arrays 200. The reflector 210 may be made of an electrically conductive material, such as copper, aluminum, etc., in order to restrain the radiation of the antenna arrays 200 in the upper half space (i.e., z>0).

The antenna arrays 200 may be, for example, linear arrays of radiating elements or two-dimensional arrays of radiating elements. In FIG. 1, only partial linear arrays 200 of radiating elements are exemplarily (and schematically) shown. In other instances, additional arrays of radiating elements (e.g., one or more arrays of high band radiating elements, one or more arrays of mid-band radiating elements and/or one or more arrays of low band radiating elements) may be mounted on the reflector 210. The low-band radiating elements may, for example, operate in the 617 MHz to 960 MHz frequency band, or one or more portions thereof, the mid band radiating elements may, for example, operate in the 1427 MHz to 2690 MHz frequency band, or one or more portions thereof, and the high band radiating elements may, for example, operate in the 3 GHz or 5 GHz frequency bands, or one or more portions thereof. Arrays of radiating elements that operate in other frequency bands may be provided (e.g., an array of radiating elements that operate in a portion of the mid band and in a portion of the high band frequency bands). Typically, dual-polarized radiating elements are used on modern base station antennas that transmit and receive RF signals at two orthogonal polarizations.

The feed network 230 may include a phase shifter, a multiplexer (e.g., a duplexer or a triplexer), a calibration network, and/or one or more power dividers. Power dividers are typically integrated in the phase shifter. The antenna arrays 200 may be fed by the feed network 230 and may each produce, for example, a pair of antenna beams, namely one antenna beam for each orthogonal polarization.

When the antenna 100 is transmitting, the feed network 230 receives RF signals from a feed interface 2301. When there are multiple arrays 200 of radiating elements, the feed network 230 may receive RF signals in multiple frequency bands from multiple feed interfaces (not shown), where each feed interface receives RF signals in a respective one of the multiple frequency bands. The feed network 230 then provides the RF signals to a respective one of the arrays 200.

When the antenna 100 is receiving, the feed network 230 receives RF signals from the antenna arrays 200, and passes the RF signals to the feed interface 2301. When there are multiple arrays 200 of radiating elements, the feed network 230 may have multiple feed interfaces 2301 such that the received RF signals in the multiple frequency bands do not need to be combined.

Next, a cavity phase shifter 300 according to some embodiments of the present invention will be described in detail with reference to FIGS. 2*a*, 2*b*, 3*a*, 3*b* and 4.

Figure 2A:
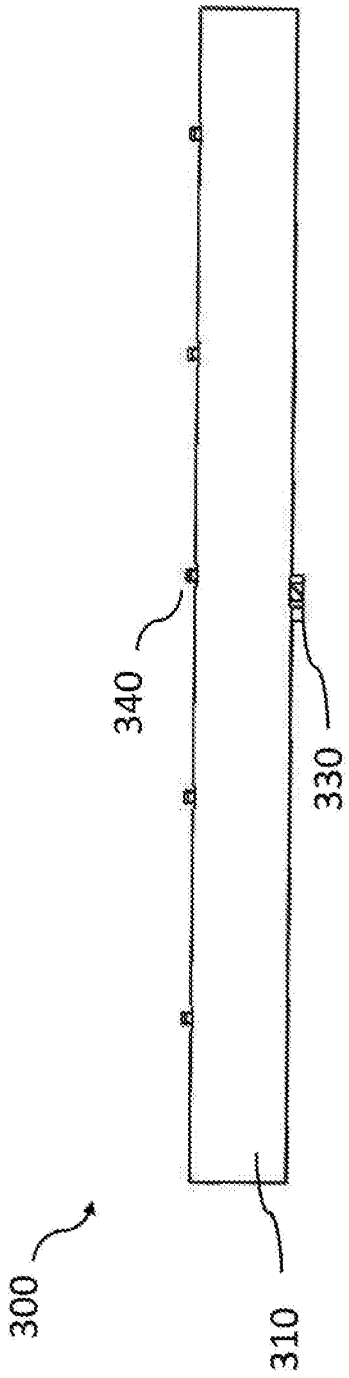
FIG. 2a is a side view of a cavity phase shifter in accordance with some embodiments of the present invention.
Figure 2B:
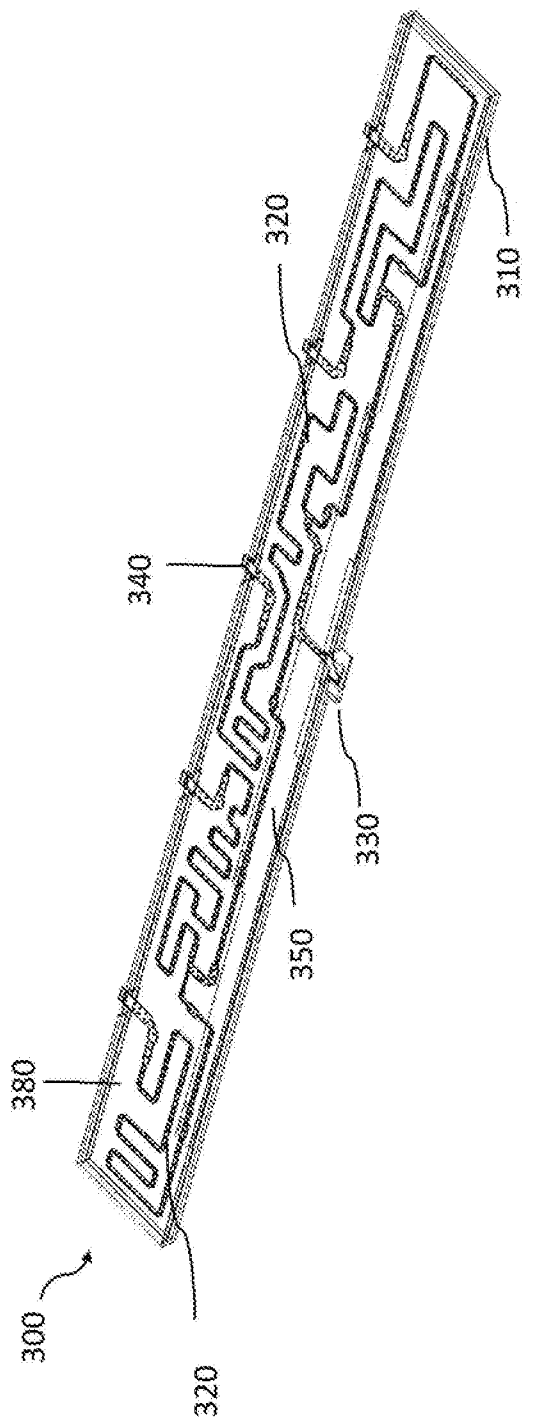

Refer now to FIGS. 2*a* and 2*b*, in which FIG. 2*a* is a side view of the cavity phase shifter 300 in accordance with some embodiments of the present invention, and FIG. 2*b* is a schematic perspective view of a printed circuit board included in the cavity phase shifter 300 of FIG. 2*a*.

Pursuant to embodiments of the present invention, a cavity phase shifter 300 is provided, which is configured as a part of the feed network 230 as described above, for adjusting the relative phase shifts applied to the sub-components of RF signals transmitted by an antenna so as to tune the electrical properties (such as the electric tilt angle) of the antenna beam.

Referring to FIGS. 2*a* and 2*b*, the cavity phase shifter 300 includes a housing 310 with a cavity 380, and a transmission line 320 (which acts as a phase shifting circuit) mounted within the cavity 380. The transmission line 320 has an input end 330 and at least one (for example, five) output ends 340. In the present embodiment, the transmission line 320 is configured as metal traces on a printed circuit board, and the input end 330 and the output ends 340 may be configured as end segments, in particular widened end segments, of the metal traces. In other embodiments, the transmission line 320 may also be configured, for example, as a metal inner conductor in a coaxial dielectric phase shifter, and the input end 330 and the output ends 340 may be configured as end segments of the metal inner conductor.

Typically, the transmission line 320 includes a single input end 330 and a plurality of output ends 340. Power dividers are provided along the length of the transmission line 320 that are used to split an RF signal that is input at the input end 320 into a plurality of sub-components that are output through the respective output ends 340.

Additionally, the cavity phase shifter 300 may also include a movable element such as, for example, a movable dielectric element 350, that is movably mounted in the cavity 380. The movable dielectric element 350 may be configured to adjust the relative phase shifts that are applied to the respective sub-components of the RF signal that are output through the respective output ends 340 of the transmission line 320. With the sliding dielectric phase shifter design shown exemplarily in the figures, the relative phase shifts are adjusted by varying the coverage area or length of the dielectric element 350 on different portions of the transmission line 320. In other phase shifter designs, the moveable element may adjust the relative physical path lengths travelled by each sub-component of the RF signal. When the antenna 100 is transmitting, the input end 330 is configured to receive the RF signals from the feed interface 2301 (it is to be understood that other parts of the feed network may also be provided between the feed interface 2301 and the cavity phase shifter 300). The RF signals are then transmitted to the respective output ends 340 via corresponding transmission paths. Each output end 340 is configured to be directly electrically connected (for example, soldered) to respective transmission lines, such as the transmission lines on the feed board 500 or feed stalk 2201 of the radiating elements 220, outside the cavity phase shifter 300. Thus, the RF signals may be transmitted to the radiating elements 220 via said other transmission lines and/or power dividers on the feed board 500. In contrast, when the antenna 100 is receiving, the RF signals may be transmitted from the corresponding output ends 340 to the input end 330.

It should also be understood that the arrangement of the transmission line 320 as shown in FIGS. 2*a* and 2*b* is only one possible case, and the number and arrangement thereof may also vary as required.

In some embodiments, the cavity phase shifter 300 may include a housing 310 (see FIG. 4) having a first cavity 3801 in which a first transmission line having one or more input ends and one or more output ends is mounted, and a second cavity 3802 in which a second transmission line having one or more input ends and one or more output ends is mounted.

In some embodiments, a plurality of transmission lines may be provided within the cavity. Each transmission line may have one or more input ends 330 and one or more output ends 340. Further, the input end(s) 330 and/or the output end(s) 340 may be disposed on different sides of the cavity phase shifter 300, respectively.

Figure 3A:
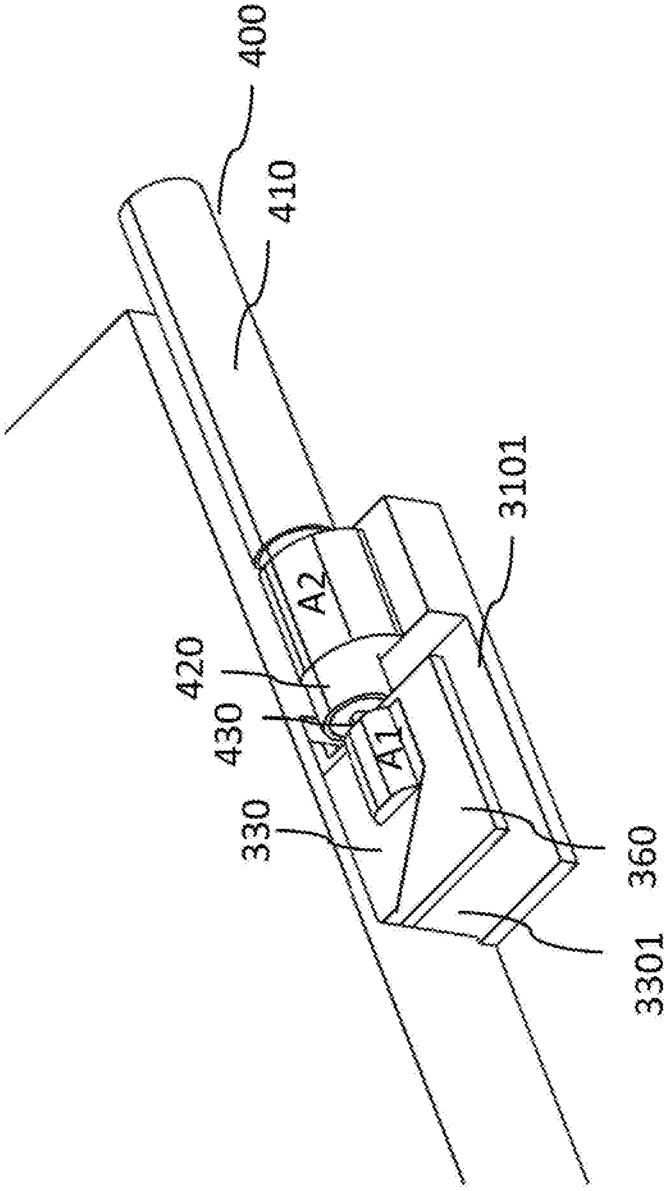
FIG. 3a is a partial schematic view illustrating a first possible implementation of the input end of the cavity phase shifter of FIGS. 2a-2b.

Refer now to FIG. 3*a*, which is a partial schematic view illustrating a first implementation of the input end 330 of the cavity phase shifter 300 of FIGS. 2*a*-2*b*.

Referring to FIG. 3*a*, the housing 310 of the cavity phase shifter 300 is provided with a window or a slot (hereinafter referred to as a first slot 3301) at a position where the input end 330 is to be provided. In the present embodiment, the first slot 3301 is disposed on a lower wall portion of the housing 310 of the cavity phase shifter 300. In other embodiments, the first slot 3301 may also be provided at other suitable locations of the housing 310.

The printed circuit board printed with the transmission line 320 has a protrusion 360. The input end 330 of the transmission line 320 may extend onto the protrusion 360. The protrusion 360 extends through the first slot 3301 to the exterior of the cavity 380 so that the input end 330 at least partially extends outside the housing 310. The housing 310 of the cavity phase shifter 300 may further include, for example, an integrally-formed protruding extension 3101 (hereinafter referred to as a first protruding extension), which cooperates with the input end 330 of the transmission line 320 so as to achieve transmission of the RF signals over the input end 330 of the transmission line 320. The first protruding extension 3101 may be disposed adjacent to the input end 330, for example, may be disposed beside and substantially parallel to the input end 330.

A cable 400 is connected to the input end 330 of the cavity phase shifter 300 and transmits, for example, RF signals from upstream to the cavity phase shifter 300 or receives RF signals from the cavity phase shifter 300. In order to achieve an effective connection between the cable 400 and the cavity phase shifter 300, an insulating sheath 410 (e.g., a cable jacket) is removed from one end of the cable 400 to expose an outer conductor 420 of the cable 400. The outer conductor 420 surrounds an insulating dielectric layer, and the insulating dielectric layer surrounds an inner conductor 430 of the cable 400. An outer segment of the exposed outer conductor 420 is stripped off together with the corresponding insulating dielectric layer to expose the inner conductor 430. The exposed inner conductor 430 is configured to be electrically connected to, for example soldered (a solder joint A1 is schematically shown in FIG. 3*a*), to the input end 330 of the cavity phase shifter 300. The exposed outer conductor 420 is configured to be electrically connected to, for example soldered (a solder joint A2 is schematically shown in FIG. 3*a*), to the first protruding extension 3101 of the cavity phase shifter 300. In this way, the first protruding extension 3101 and further the housing 310 of the cavity phase shifter 300 may serve as a ground plane to allow effective transmission of RF signals within the cavity 380.

The above-described technique for connecting the coaxial cable 400 to the input end 330 of the cavity phase shifter 300 may have several advantages: connection of the cable 400 with the input end 330 may be advantageously performed outside the cavity phase shifter 300, thereby simplifying manufacturing and improving efficiency. Further, the inner conductor 430 of the cable 400 does not need to be bent, thereby avoiding the occurrence of parasitic inductance due to bending of the inner conductor 430. It should be understood that parasitic inductance may make the impedance matching between the cable 400 and the input end 330 of the cavity phase shifter 300 more difficult and thus may increase return loss, especially when the antenna system operates in a high operating frequency band, where the effect of the parasitic inductance may be significant.

Figure 3B:
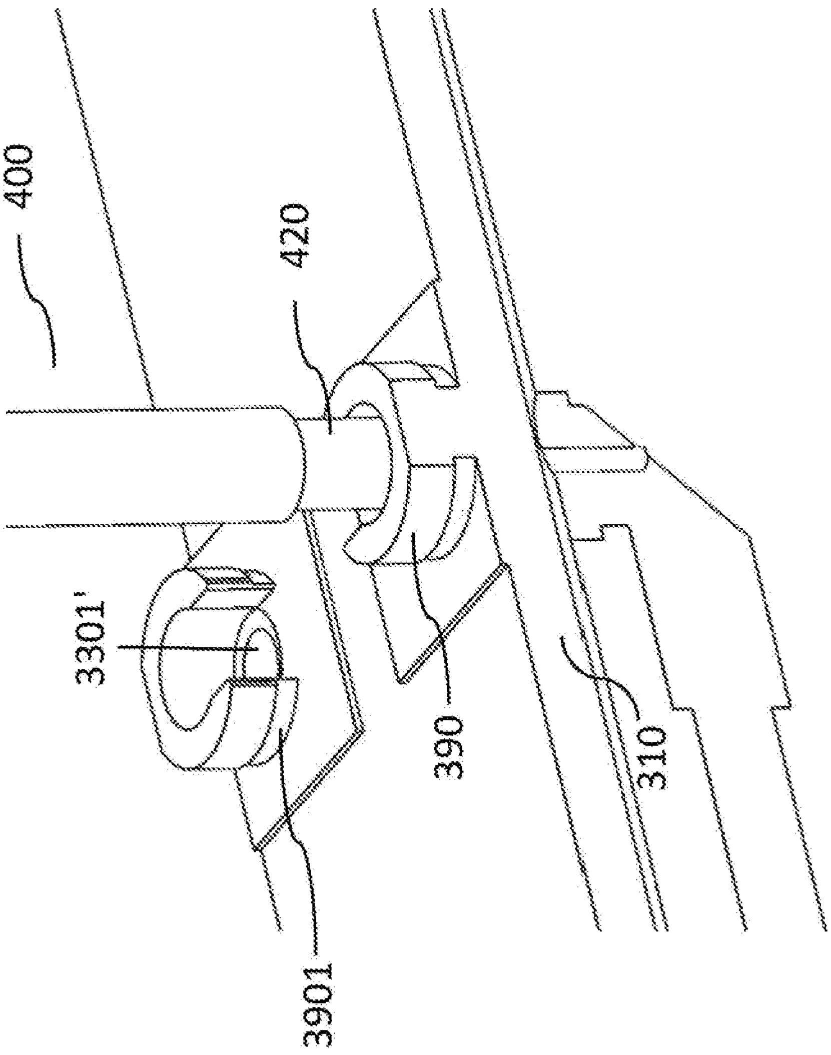
FIG. 3b is a second partial schematic view illustrating a second possible implementation of the input end of the cavity phase shifter of FIGS. 2a-2b.

Refer now to FIG. 3*b*, which is a partial schematic view illustrating an alternative implementation of the input end 330 of the cavity phase shifter 300 according to some embodiments of the present invention.

Referring to FIG. 3*b*, the housing 310 of the cavity phase shifter 300 is provided with an opening, such as a circular slot 3301' at a position where the input end 330 is to be provided. Around the circular slot 3301' a cylindrical engagement wall 390 is provided, which may be integrally-formed with the housing 310. In other embodiments, the engagement wall 390 may be formed as a separate component from the housing 310 and may, for example, be connected to the housing by soldering or by interference fit. The engagement wall 390 is configured to engage the cable 400 in a manner perpendicular to the circular slot 3301'. The exposed outer conductor 420 of the cable 400 may be soldered to the inner side of the engagement wall 390. Further, the inner conductor (not shown), or the inner conductor together with the insulating dielectric layer, of the cable 400 may pass through the circular slot 3301', extend into the cavity phase shifter 300, namely into the cavity 380, and be soldered to the input end of the transmission line therein. Additionally, as shown in FIG. 3*b*, the engagement wall 390 has a thinned portion 3901, on which a clamping member (not shown) may be disposed for further fixing the cable 400 and protecting the solder joint.

The above-described technique for connecting the coaxial cable 400 to the input end 330 of the cavity phase shifter 300 may have several advantages: First, the inner conductor 430 of the coaxial cable 400 is located inside the engagement wall 390 without being exposed to the ambient, thereby reducing radiation losses. Second, the inner conductor 430 extends inside the engagement wall 390 in a direction that is substantially perpendicular to the cavity phase shifter 300, and hence it is not necessary to bend the inner conductor 430 which can result in increased return loss. Further, the engagement wall 390 engages the outer conductor 420 on multiple sides (i.e., is surface engaging rather than point or line engaging) over a two-dimensional surface, thereby improving the accuracy and consistency of the electrical connection.

It should be understood that the connection schemes shown in FIGS. 3*a* and 3*b* are two exemplarily schemes, and the specific connection schemes may be varied in different application situations.

Figure 4:
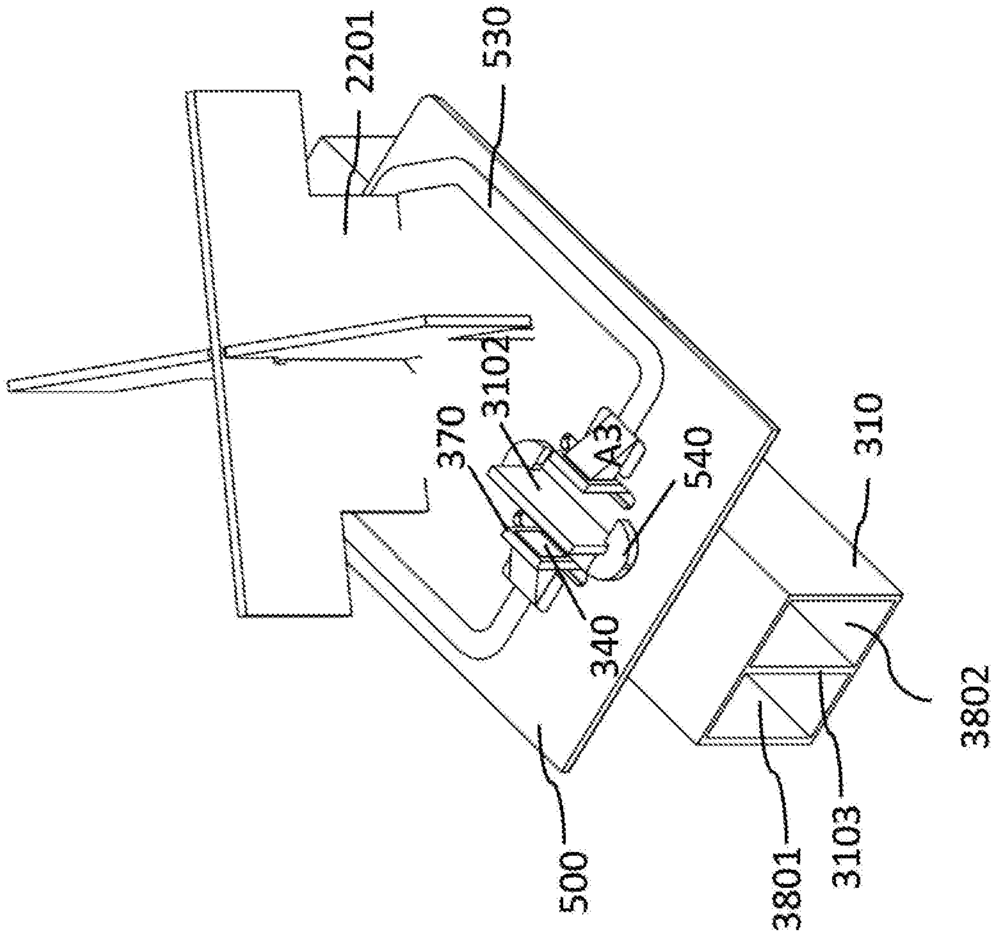
FIG. 4 is a partial schematic perspective view of the cavity phase shifter of FIGS. 2a-2b together with a feed board, at an output end of the cavity phase shifter, in accordance with some embodiments of the present invention.
Figure 5:
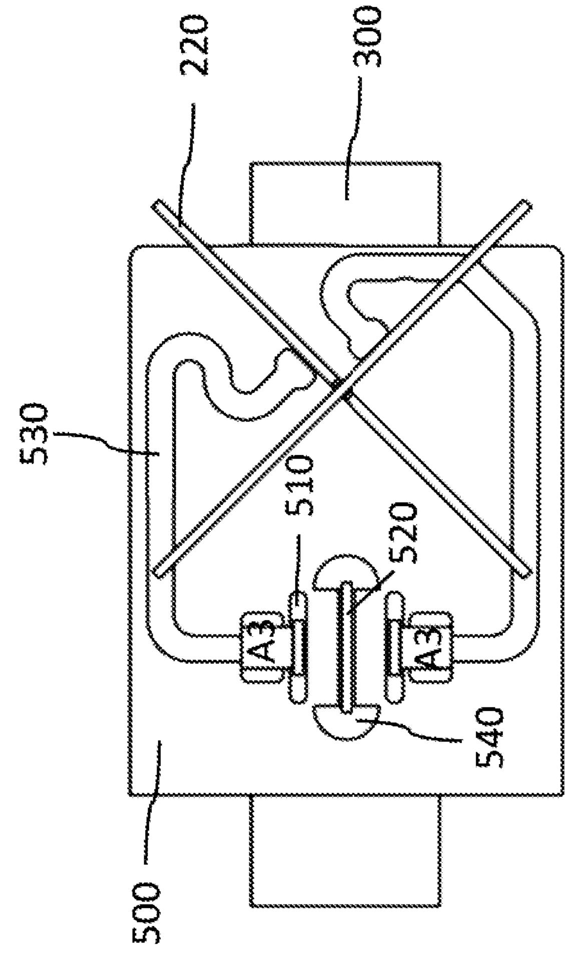
FIG. 5 is a top view of FIG. 4.

Pursuant to embodiments of the present invention, the output end 340 of the transmission line 320 of the cavity phase shifter 300 may transmit RF signals to other transmission lines outside the cavity 380 or receive RF signals from the other transmission lines without the aid of a cable. Refer now to FIGS. 4 and 5, in which FIG. 4 is a partial schematic perspective view showing the cavity phase shifter 300 together with a feed board 500 at the output end 340 of the cavity phase shifter 300, in accordance with some embodiments of the present invention, and FIG. 5 is a top view of FIG. 4.

Referring to FIG. 4, the cavity phase shifter 300 includes a housing 310 having two cavities 380 (a first cavity 3801 and a second cavity 3802). The first cavity 3801 is separated from the second cavity 3802 by, for example, a partition wall 3103. A first transmission line together with a movable first dielectric element (not shown) may be mounted within the first cavity 3801, and a second transmission line together with a movable second dielectric element (not shown) may be mounted within the second cavity 3802. Each output end of the first transmission line is capable of feeding sub-components of an RF signal having a first polarization to respective radiating elements (or groups of radiating elements) without the aid of a cable, and each output end of the second transmission line is capable of feeding sub-components of an RF signal having a second polarization to the respective radiating elements (or groups of radiating elements) without the aid of a cable.

The cavity phase shifter 300 is provided with a respective window or slot (an example one of which is hereinafter referred to as a second slot) at positions where the output ends 340 of the transmission line 320 are located. In the present embodiment, the second slot is disposed on an upper wall portion of the housing 310 of the cavity phase shifter 300. In other embodiments, the second slot may also be provided at other suitable locations of the housing 310. The printed circuit board including the transmission line 320 may be provided with a protrusion 370 carrying one output end 340 of the transmission line 320. The protrusion 370 extends through the second slot to the exterior of the cavity 380 so that the output end 340 may be electrically connected (such as soldered) externally. The housing 310 of the cavity phase shifter 300 further includes, for example, an integrally-formed protruding extension 3102 (hereinafter referred to as a second protruding extension), which cooperates with the output end 340 of the transmission line 320 so as to achieve transmission of the RF signals over the output end 340 of the transmission line 320. The second protruding extension 3102 may be disposed adjacent the output end 340, for example, may be disposed beside and substantially parallel to the output end 340. In the present embodiment, the second protruding extension 3102 may be configured to protrude from the partition wall 3103 between the first cavity 3801 and the second cavity 3802. In this way, an output end 340 of the transmission line 320 inside the first cavity 3801 and an output end 340 of the transmission line 320 inside the second cavity 3802 can share one second protruding extension 3102 as a ground plane, which facilitates a compact wiring layout.

In order to feed the radiating element 220 without the aid of a cable, the output end 340 of the transmission line 320 or the extension 370 may extend, for example, vertically upward (z-direction) from the interior of the cavity 380 through a reflector (not shown) and a feed board 500. Likewise, the second protruding extension 3102 may also extend, for example, vertically upward through the reflector (not shown) and the feed board 500. To this end, referring to FIG. 5, the feed board 500 is provided with a third slot 510 for each output end 340 and a fourth slot 520 for each second protruding extension 3102. Correspondingly, the reflector shall also be provided with slots corresponding to the third slot 510 and the fourth slot 520. In this way, the output ends 340 may reach the printed metal pattern on the feed board 500, and be electrically connected, for example, soldered, to a connection portion A3 preset on the transmission line 530; and the second protruding extension 3102 may reach the printed metal pattern on the feed board 500, and be soldered to a pad 540, which is electrically connected to a ground metal layer on the feed board 500 via metallized vias. Thus, the RF signals from the feed interface 2301 may be transmitted to the transmission line 530 on the feed board 500 as described above without the aid of a cable after being subjected to phase shifting within the cavity phase shifter 300, and the transmission line 530 may feed the RF signals to one or more radiating elements 220. Such connection between the cavity phase shifter 300 and the feed board 500 without a cable is advantageous, because the insertion loss associated with the cable is eliminated, and hence the gain of the antenna may be improved.

It should also be understood that the arrangement shown in FIGS. 4 and 5 is only one possible case, and the arrangement thereof may also vary as required.

In some embodiments, the output ends 340 may be configured to be electrically connected, such as soldered, to a transmission line on a feed stalk 2201 of the radiating element 220.

In some embodiments, the output end 340 is configured to be electrically connected to other transmission lines, such as the transmission lines on the feed board 500 or feed stalk 2201 of the radiating elements 220, outside the cavity phase shifter 300 by means of probes or other conductive elements.

In some embodiments, the output ends 340 of the transmission lines 320 within the first cavity 3801 and the second cavity 3802 may also be provided to a separate protruding extension, respectively.

Although exemplary embodiments of this invention have been described, those skilled in the art should appreciate that many variations and modifications are possible in the exemplary embodiments without materially departing from the spirit and scope of the present invention. Accordingly, all such variations and modifications are intended to be included within the scope of this invention as defined in the claims. The present invention is defined by the appended claims, and equivalents of these claims are also contained.

What is claimed is:

1. A cavity phase shifter, comprising:

a housing having a cavity and a protruding extension extending outwardly from an outer surface of the housing;

a printed circuit board mounted in the cavity, the printed circuit board having a transmission line thereon and a protrusion extending through a first slot in the housing and exterior of the cavity, wherein the transmission line is provided with an input end extending onto the protrusion and an output end; and a dielectric element having at least a movable portion mounted within the cavity, wherein movement of the movable portion of the dielectric element is configured to adjust a phase shift experienced by an RF signal that travels between the input end and output end of the transmission line, wherein the input end of the transmission line is configured to be electrically connected to an inner conductor of an input cable exterior of the cavity, the first protruding extension is configured to be electrically connected to an outer conductor of the input cable exterior of the cavity, and the output end of the transmission line is configured to electrically connected to another transmission line exterior of the cavity without the aid of a cable.

2. The cavity phase shifter according to claim 1, wherein the transmission line is configured as a printed trace on the first-printed circuit board.

3. The cavity phase shifter according to claim 1, wherein the protruding extension is disposed adjacent the input end of the transmission line.

4. The cavity phase shifter according to claim 3, wherein the protruding extension is a first protruding extension, and the housing has a second protruding extension configured to be soldered to a pad on a feed board for radiating elements, the pad being electrically connected to a ground metal layer on the feed board.

5. The cavity phase shifter according to claim 4, wherein the transmission line has a plurality of output ends, and wherein each output end has a corresponding second protruding extension.

6. The cavity phase shifter according to claim 1, wherein the slot in the housing is a first slot, and the housing is provided with a second slot through which the output end of the transmission line extends exterior of the cavity.

7. The cavity phase shifter according to claim 6, wherein the output end of the transmission line extends through the second slot, a reflector and a feed board.

8. The cavity phase shifter according to claim 1, wherein the cavity includes a first cavity in which a first transmission line is mounted and a second cavity in which a second transmission line is mounted.

9. The cavity phase shifter according to claim 1, wherein the housing is provided with an opening and an engagement wall that extends at least part of the way around the opening, and wherein the engagement wall extends outward in a direction perpendicular to the opening.

10. The cavity phase shifter according to claim 9, wherein the engagement wall is configured to be soldered with an outer conductor of a cable, and wherein an inner conductor of the cable is capable of passing through the opening and extending into the at least one cavity and being soldered to the input end of the transmission line.

11. A cavity phase shifter, comprising:

a housing having a cavity and a protruding extension extending outwardly from an exterior surface of the housing;

a printed circuit board mounted in the cavity, the printed circuit board having a first transmission line mounted thereon and a protrusion extending through a slot in the housing and exterior to the cavity, wherein the first transmission line is provided with an input end extending onto the protrusion and an output end; and a dielectric element having at least a movable portion mounted within the cavity, wherein the movable portion of the dielectric element is configured to adjust a phase shift experienced by an RF signal that travels between the input end and output end of the first transmission line, wherein the input end of the first transmission line is configured to be soldered to an inner conductor of a cable exterior to the cavity, the first protruding extension is configured to be soldered to an outer conductor of the cable exterior to the cavity, and the output end is configured to be soldered to a second transmission line on a feed board for radiating elements.

12. The cavity phase shifter according to claim 11, wherein the housing is provided with a first slot, through which the input end of the first transmission line protrudes or through which an inner conductor of a cable is capable of extending into the first cavity, and the input end is configured to be soldered to the inner conductor of the cable.

13. The cavity phase shifter according to claim 12, wherein the housing is provided with a second slot through which the output end of the first transmission line protrudes, and the output end is configured to be soldered to a transmission line on a feed board for radiating elements.

14. The cavity phase shifter according to claim 11, wherein the output end of the first transmission line extends through a reflector and the feed board for radiating elements from the interior of the first cavity.

15. The cavity phase shifter according to claim 11, wherein the housing has a protruding extension configured to be soldered to a pad on the feed board for radiating elements, the pad being electrically connected to a ground metal layer on the feed board.

16. The cavity phase shifter according to claim 11, wherein the housing further includes a second cavity, the second cavity and the first cavity being separated from each other via a partition wall, wherein a second transmission line is mounted in the second cavity, the second transmission line is provided with an input end and an output end, and the output end of the second transmission line is configured to be soldered to a transmission line on a feed board for radiating elements.

* * * * *